(12) United States Patent
Rana et al.

(10) Patent No.: US 9,446,341 B2
(45) Date of Patent: Sep. 20, 2016

(54) SUB-ATMOSPHERIC PRESSURE GAS SCRUBBERS

(75) Inventors: Manilal Gordhandas Rana, Bolton (GB); Donovan Collins, Bolton (GB)

(73) Assignee: Edwards Limited, Crawley (GB)

( * ) Notice: Subject to any disclaimer, the term of this patent is extended or adjusted under 35 U.S.C. 154(b) by 280 days.

(21) Appl. No.: 14/234,294

(22) PCT Filed: Jul. 6, 2012

(86) PCT No.: PCT/GB2012/051584
§ 371 (c)(1),
(2), (4) Date: Jan. 22, 2014

(87) PCT Pub. No.: WO2013/014421
PCT Pub. Date: Jan. 31, 2013

(65) Prior Publication Data
US 2014/0182457 A1 Jul. 3, 2014

(30) Foreign Application Priority Data

Jul. 22, 2011 (GB) .................................. 1112715.6

(51) Int. Cl.
| | | |
|---|---|---|
| *B01D 53/18* | (2006.01) | |
| *B01D 47/06* | (2006.01) | |
| *F04B 37/12* | (2006.01) | |

(52) U.S. Cl.
CPC ............. *B01D 47/06* (2013.01); *B01D 47/063* (2013.01); *B01D 53/18* (2013.01); *B01D 53/185* (2013.01); *F04B 37/12* (2013.01); *B01D 2252/2023* (2013.01)

(58) Field of Classification Search
CPC .... B01D 53/18; B01D 53/185; B01D 47/06; B01D 47/063; F04B 37/12
USPC ......... 96/240, 242, 245, 251, 268, 270, 272, 96/273, 322
See application file for complete search history.

(56) References Cited

U.S. PATENT DOCUMENTS 2,694,603 A * 11/1954 Griffin ................. B05B 1/3447
239/106
3,091,513 A    5/1963 Parish
(Continued)

FOREIGN PATENT DOCUMENTS

| BE | 536896 A | 4/1955 |
|---|---|---|
| CN | 101820970 A | 9/2010 |

(Continued)

OTHER PUBLICATIONS

Examination Report from counterpart European Patent Application No. 12740637.9, dated Jan. 5, 2015, 5 pages.

(Continued)

*Primary Examiner* — Frank Lawrence
(74) *Attorney, Agent, or Firm* — Shumaker & Sieffert, P.A.

(57) ABSTRACT

In order to minimize the amount of contaminants that pass through a pump, or that are allowed to accumulate therein, a sub-atmospheric pressure gas scrubber suitable for use upstream of a vacuum pump is provided. The gas scrubber comprising a vessel and means for forming a spray of cleaning solvent within the vessel, the vessel comprising an inlet and an outlet for the gas to be cleaned at sub atmospheric pressure, the inlet and outlet being arranged to cause the gas to be cleaned to pass through the spray of cleaning solvent, the means for forming a spray comprising a cleaning solvent inlet connected to at least one spray nozzle and a cleaning solvent outlet through which used solvent can be pumped from the vessel using a pump, wherein the pump is arranged to recirculate the used solvent back to the cleaning solvent inlet.

15 Claims, 7 Drawing Sheets

(56) References Cited

U.S. PATENT DOCUMENTS

| | | | | |
|---|---|---|---|---|
| 4,374,813 | A | * | 2/1983 | Chen ............... B01D 47/06 261/117 |
| 4,828,768 | A | * | 5/1989 | Talmor ............ B01D 47/10 261/116 |
| 5,531,801 | A | * | 7/1996 | Sewell ............ B01D 47/06 95/10 |
| 6,007,604 | A | | 12/1999 | Risse |
| 6,667,419 | B1 | * | 12/2003 | Matsumoto ...... B01D 53/18 562/485 |
| 8,535,419 | B2 | * | 9/2013 | Wind ............ B01D 53/1425 423/228 |
| 2003/0066421 | A1 | * | 4/2003 | Ku ................ B01D 47/06 95/149 |
| 2007/0059229 | A1 | * | 3/2007 | Temple ............ A61L 9/145 423/243.01 |
| 2008/0174032 | A1 | | 7/2008 | Murata et al. |
| 2010/0230830 | A1 | | 9/2010 | Farsad et al. |
| 2011/0061533 | A1 | * | 3/2011 | Black ............ B01D 53/1406 95/195 |
| 2013/0236366 | A1 | | 9/2013 | Hagen et al. |

FOREIGN PATENT DOCUMENTS

| | | |
|---|---|---|
| DE | 2600534 A1 | 7/1977 |
| DE | 3918452 A1 | 12/1990 |
| DE | 19755571 A1 | 6/1999 |
| EP | 14888844 A1 | 12/2004 |
| GB | 936930 | 9/1963 |
| JP | 07313824 A | 12/1995 |
| JP | 08281039 A | 10/1996 |
| WO | 9801214 A1 | 1/1998 |
| WO | 2009014285 A1 | 1/2009 |
| WO | 2009030330 A1 | 3/2009 |

OTHER PUBLICATIONS

Notification of Transmittal of the International Search Report and Written Opinion mailed Jan. 22, 2013 in corresponding PCT Application No. PCT/GB2012/051584, 17 pgs.

Search Report under Section 17 mailed Nov. 30, 2011 in GB Application No. GB1112715.6 from the GB Intellectual Property Office, 4 pgs.

Examination Report from counterpart European Application No. 12740637.9, dated Apr. 11, 2016, 7 pp.

Second Office Action from counterpart Chinese Application No. 201280046145.4, dated Mar. 3, 2016, 22 pp.

* cited by examiner

SUB-ATMOSPHERIC PRESSURE GAS SCRUBBERS

This application is a national stage entry under 35 U.S.C. §371 of International Application No. PCT/GB2012/051584, filed Jul. 6, 2012, which claims the benefit of G.B. Application 1112715.6, filed Jul. 22, 2011. The entire contents of International Application No. PCT/GB2012/051584 and G.B. Application 1112715.6 are incorporated herein by reference.

TECHNICAL FIELD

The present disclosure relates to sub atmospheric pressure gas scrubbers. In particular, the present disclosure relates to a gas scrubber that is suitable for use up stream of a vacuum pump.

BACKGROUND

Many industrial processes require vacuums in order to work. For example, in the manufacturing of polymers, foodstuffs, moldings and the like a vacuum is often required to initiate or sustain a chemical reaction, drive off excess moisture, to de-gas materials or to assist in the forming and shaping of manufactured products. In many cases, vacuums are used in conjunction with wet chemical processes, which leads to partial evaporation of the chemicals involved, which in turn means that gases drawn from the processes can contain contaminants.

An industrial pumping system will often comprise a number of pumps connected in series or in parallel to provide increasingly higher vacuum pressures from one pumping stage to the next. A dry vacuum pump, that is one that is designed to pump gases without using a sealing liquid in the vacuum pump swept volume, generally comprises one or more rotors arranged to cooperate with a stator: movement of the rotors causing the gas to be drawn into the pump and pushed through it towards an exhaust port of the pump. In order that the pumped gas does not backflow, and to improve the pumping efficiency of the pump, the gaps between the rotors and stators are minimized—usually to within a few hundred microns.

A problem therefore arises when the gas being pumped contains contaminants, which can build up on the surfaces of the rotors and stators thereby closing the gap between them. When a certain thickness of contaminants has built-up on the surface of the rotors and stators there is a chance that the pump will jam preventing further operation or restarting without remedial maintenance.

In most situations, vacuum pumps run hot, that is the act of compressing the gas being pumped causes heating of the gas, which heat is transferred to the rotors and stators of the pumps. In such a situation the majority of the contaminants within the gas being pumped will not condense on the rotors and stators and will simply pass through the pump. Moreover, because the pump components are hot, in use, contaminants that are viscous liquids will generally remain in a low-viscosity state thereby enabling the pump to continue running. However, when the pump is switched off, the contaminants may have a tendency to thicken or harden upon cooling, thereby preventing the pump from being restarted, even though, when hot, it was able to run.

In the alternative situation, that is where the pump components exceed certain temperatures, there is a chance that contaminants within the pumped gas will react to form hard compounds that may build up on the rotor and stator surfaces. Hard compounds on the rotor and stator surfaces can cause excessive or premature wear of the pump components, thereby degrading the efficiency of the pump or even leading to catastrophic failure.

SUMMARY

It is an object of this disclosure to provide a solution to one or more of the above problems, to provide an improved or alternative gas scrubber for use in conjunction with a vacuum system, or for protecting dry vacuum pumps, ejector pumps and interstage condensers, any of which can also become blocked by process gas contaminants.

According to a first aspect of the disclosure there is provided a gas scrubber suitable for use upstream of a dry vacuum pump, the gas scrubber comprising a vessel and means for forming a spray of cleaning solvent within the vessel, the vessel comprising an inlet and an outlet for the gas to be cleaned, the inlet and outlet being arranged to cause the gas to be cleaned to pass through the spray of cleaning solvent, the means for forming a spray comprising a cleaning solvent inlet connected to at least one spray nozzle and a cleaning solvent outlet through which used solvent can be pumped from the vessel using a pump, wherein the pump is arranged to recirculate the used solvent back to the cleaning solvent inlet.

The gas scrubber is most suited to use in sub-atmospheric pressure conditions, which, in many practical situations, will be from about 1-50 mbarA. One of the main restrictions on the working pressure of the scrubber is the vapor pressure of the solvent. In other words, the working pressure of the scrubber must be higher than the vapor pressure of the cleaning solvent to prevent the cleaning solvent from boiling or evaporating. However, in situations where a lower operating pressure is required, a cleaning solvent having a correspondingly lower vapor pressure will need to be selected.

The pump can be a re-circulating pump, for example centrifugal recirculating pump, although other pump types may be used.

The process gas inlet and outlet ports are preferably offset, inclined or angled with respect to one another to cause the process gas to change direction as it passes through the vessel.

The process gas and solvent sprays are preferably arranged to contraflow.

A heat exchanger is preferably interposed between the provided downstream cleaning solvent outlet and the cleaning solvent inlet to regulate the temperature of the cleaning solvent. The heat exchanger may be of any suitable type, although a water-cooled shell and tube type of heat exchanger is preferred. The cooling water preferably passes on the shell side of the heat exchanger with the cleaning solvent passing through the tubes.

A temperature sensor may be provided for sensing the temperature of the cleaning solvent. The temperature sensor, where provided, is preferably connected to means, for example a mechanical valve actuated by gas pressure caused by a temperature differential or a motorized valve, for controlling the flow of cooling water through the heat exchanger, and hence regulating the temperature of the cleaning solvent.

Means is preferably provided for priming the pump and or providing the pump with a minimum head pressure. To achieve this, the pump is preferably located at a level below the vessel. Additionally or alternatively, a desired minimum volume of cleaning fluid may be maintained within the vessel. Additionally or alternatively, a desired maximum volume of cleaning fluid may be maintained within the vessel. The vessel may therefore be provided with an either or both of an upper level sensor and a lower level sensor for sensing whether the volume of cleaning solvent within the vessel is between the desired maximum and minimum. The upper and lower level sensors, where provided, are preferably connected to control means for draining and topping-up the volume of cleaning solvent within the vessel, respectively.

The lower level sensor, where provided, may be connected to a motor controller of the pump to cause the pump to slow down or stop in the event that the volume (or level) of cleaning solvent within the vessel falls below the desired minimum. In addition, the lower level sensor, where provided, may be connected to a servo-operated valve of a top up line connected at one end to a supply of fresh solvent and at its other end to an outlet located within the vessel above the upper solvent level line.

The upper level sensor, where provided, may be connected to the motor controller of the pump, that is to speed-up the pump, thereby draining the vessel, when the volume of cleaning solvent within the vessel exceeds the desired maximum. The upper level sensor may also be connected to a drain valve.

A solvent quality sensor may be provided for analysing the condition of the solvent. The solvent quality sensor, where provided, can be any sensor that senses any property of solvent that varies with quality, for example a specific gravity sensor, resistivity sensor, a capacitance sensor, a viscosity sensor, an in-line flow sensor, and the like. Additionally or alternatively, the power consumption of the pump, which is related to the solvent's viscosity, could be monitored as an indicator of the solvent quality or purity.

One or more in-line filters are preferably provided, for example upstream of the pump or upstream of the heat exchanger. Isolating valves may be provided either side of the filters, where provided, to enable them to be changed or cleaned should they become clogged.

The gas scrubber is preferably mounted on a skid.

According to a second aspect of the disclosure there is provided a gas scrubber suitable for use upstream of a vacuum pump, the gas scrubber comprising a vessel and means for forming a spray of cleaning solvent within the vessel, the vessel comprising an inlet and an outlet for the gas to be cleaned, the inlet and outlet being arranged to cause the gas to be cleaned to pass through the spray of cleaning solvent, the means for forming a spray comprising a plurality of spray nozzles each spray nozzle being arranged to form a spray pattern of cleaning solvent within the vessel, wherein the spray patterns are arranged to overlap radially, axially or radially and axially.

The gas scrubber is preferably locatable upstream of a dry vacuum pump.

Preferably, the gas to be cleaned passes, by at least a desired minimum distance, through at least one spray pattern of cleaning solvent.

Preferably, there is a main spray nozzle, which may be mounted substantially coaxially with the vessel. The additional spray nozzles are may be offset radially, axially or radially and axially with respect to the main spray nozzle. Most preferably, there is one main spray nozzle and three additional spray nozzles.

The spray nozzles are preferably located within an upper portion of the vessel at a level below that of the process gas outlet port.

The nozzles are preferably adapted to produce a substantially solid conical, downwardly directed spray of cleaning solvent. The cone of spray form each nozzle preferably emanates from the nozzle and travels axially and a radially to impinge upon the inner sidewalls of the vessel a point below the level of the nozzle, but above the level of the inlet port for the process gas.

The main nozzle is preferably adapted to form a full circular spray pattern that covers the whole inside diameter of the vessel.

The nozzles may be co-planar, but have differing spray patterns to produce overlapping sprays of cleaning solvent. The additional nozzles may be located radially outwardly of the main nozzle, but adapted to provide substantially conical sprays of cleaning solvent that impinge upon the inner sidewalls of the vessel at a point higher up the vessel than the cone of the main nozzle.

The nozzles may be inclined with respect to a lateral plane of the vessel to produce angled sprays of cleaning solvent, for example a helical flow of cleaning solvent spray.

The nozzles, where provided, preferably have an opening of, or about 6.4 mm. The nozzles are preferably self-cleaning, for example, using the pressure of the recirculating pump recirculating the solvent at a high pressure to keep the nozzle orifice open and may have removable vanes that can also be adjustable.

The vessel is preferably provided with an inwardly-projecting annular flange on its inner sidewall. The location and dimensions of the annular flange, where provided, is preferably adjustable or interchangeable.

BRIEF DESCRIPTION OF DRAWINGS

Preferred examples shall now be described, by way of example only, with reference to the accompanying drawings in which.

DETAILED DESCRIPTION

It is therefore desirable to minimize the amount of contaminants that pass through a pump, or that are allowed to accumulate therein. In many cases, the adverse effects of contaminants in the pumped gas can be controlled satisfactorily by providing the pump with a thermal jacket to heat or cool the pump such that the contaminants building up on the pump are prevented from solidifying or hardening or reacting to form hard compounds. Most dry pumps require a cooling system although a heating jacket could be provided to keep the pump warm when it is not running. This is inconvenient and expensive to install and may use a lot of energy, (albeit less expensive than the cost of reinstating a seized pump). A heating jacket could, for example, comprise a hot water circuit acting as coolant when the pump is not running or even when it is running. However, thermal jackets require considerable amount of energy to operate and may not always be reliable.

A need therefore arises for an improved method of protecting vacuum pumps from contamination.

Figure 1:
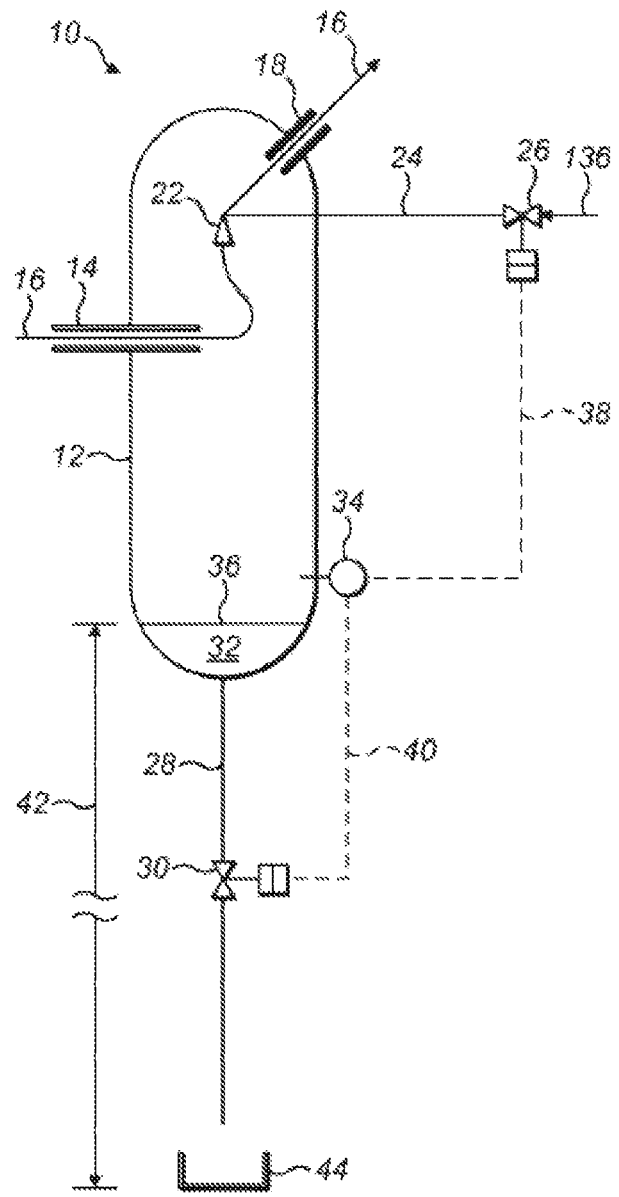
FIG. 1 is a schematic system diagram of a known gas scrubber.

It is known to provide a gas scrubber upstream of a pump and a known gas scrubber is shown in FIG. 1, and described in detail below. Such a known scrubber comprises a vessel into which a gas cleaning solvent is pumped to form a spray or mist that contraflows with the process gas to be cleaned. The solvent interacts with the contaminants in the process gas to remove them, and the solvent and contaminants are sluiced to waste. Such a known type of gas scrubber consumes a large amount of solvent and is thus expensive to operate. Moreover, the relatively large volume of contaminated solvent produced can be difficult or costly to process. In addition, a known type of gas scrubber can provide non-uniform gas scrubbing as process gas passing through different parts of the vessel is subjected to different amounts of interaction with the cleaning solvent.

Finally, in the known gas scrubber, the used solvent effectively drains to an open dump tank and to ensure that the process gas vacuum is maintained, a barometric leg must usually be employed. In modest or high vacuum systems, the barometric leg must be relatively large so as to not break the process vacuum, which greatly increases the overall height of apparatus needed and places other constructional constraints on the design of the scrubber. This can make indoor installations of gas scrubber impractical or uneconomic.

Another type of known gas scrubber utilises a packed column or vessel with demister pads to filter the process gas. However, filter-type scrubbers can have high pressure drops, which are undesirable in a vacuum application, and the filters can become blocked with contaminants.

In FIG. 1, a known in-line gas scrubber 10 suitable for use in a vacuum pumping system shown. The gas scrubber 10 comprises a hollow vessel 12 having an inlet port 14 through which process gas 16 enters scrubber 10 and outlet port 18 leading to the first stage of a vacuum pumping system (not shown).

Inlet port 14 is located at a position that meets the requirements of enabling the spray to develop, the provision of a disengagement space, optimal vapor velocity and a desired hold-up volume. The outlet port 18 is located towards the top of the vessel 12. It will be noted that the inlet port 14 is aligned substantially horizontally whereas the outlet port 18 is inclined to the horizontal. The purpose of this is to cause the process gas 16 to have to change direction a few times as it passes through the vessel thereby increasing the amount of time it spends inside the vessel 12 before being extracted by the vacuum pumping system.

Located within an upper portion of the vessel 12 is one or more downwardly directed nozzles 22 adapted to spray a mist of solvent into the interior of the vessel 12. Solvent is fed into the nozzle 22 via a supply line 24 from a tank (not shown) of solvent. The delivery of the solvent to the nozzle 22 is controlled using an in-line valve 26 on the supply line 24. Thus, solvent enters the vessel 12 via the supply line 24 and a spray downwardly to form a mist within the vessel 12 by the nozzle 22. Meanwhile, process gas 16 entering the vessel through inlet port 14 moves upwardly, that is contraflows, through the solvent mist enabling contaminants within the process gas 16 to be removed from it by dissolution into the droplets of solvent. The contaminated solvent falls to the bottom of the vessel 12 under the influence of gravity and is removed and via a drain line 28.

The drain line 28 optionally has an in-line valve 30 to control the egress of contaminated solvent from the vessel 12. If the flow rate of solvent into the vessel 12 is higher than the flow rate of solvent out of the vessel 12, then a quantity of solvent will pool 32 in the bottom of the vessel 12. To avoid the vessel 12 from over-filling, a solvent level sensor 34 is provided in the bottom of the vessel 12 for sensing the level 36 of the pool of solvent 32. If the level 36 rises above the level of the solvent level sensor 34 control lines 38 and 40 operate the inlet valve 26 and the outlet valve 32 drain the vessel and maintain the level 36 below that of the level sensor 34.

To maintain the low pressure of the process gas 16, a barometric leg is required between the outlet line 38 and the dump tank 44 into which the contaminated solvent drains. The barometric leg is necessarily quite tall-often around 10 m in length, thereby making system difficult to install indoors. Additionally, it will be noted that a continuous supply of solvent is required and a corresponding amount of contaminated solvent needs to be disposed of. Accordingly, the known gas scrubber 10 occupies a large volume, consumes a lot of solvent and produces large volumes of contaminated solvent, which need to be disposed of in an environmentally friendly manner.

Figure 2:
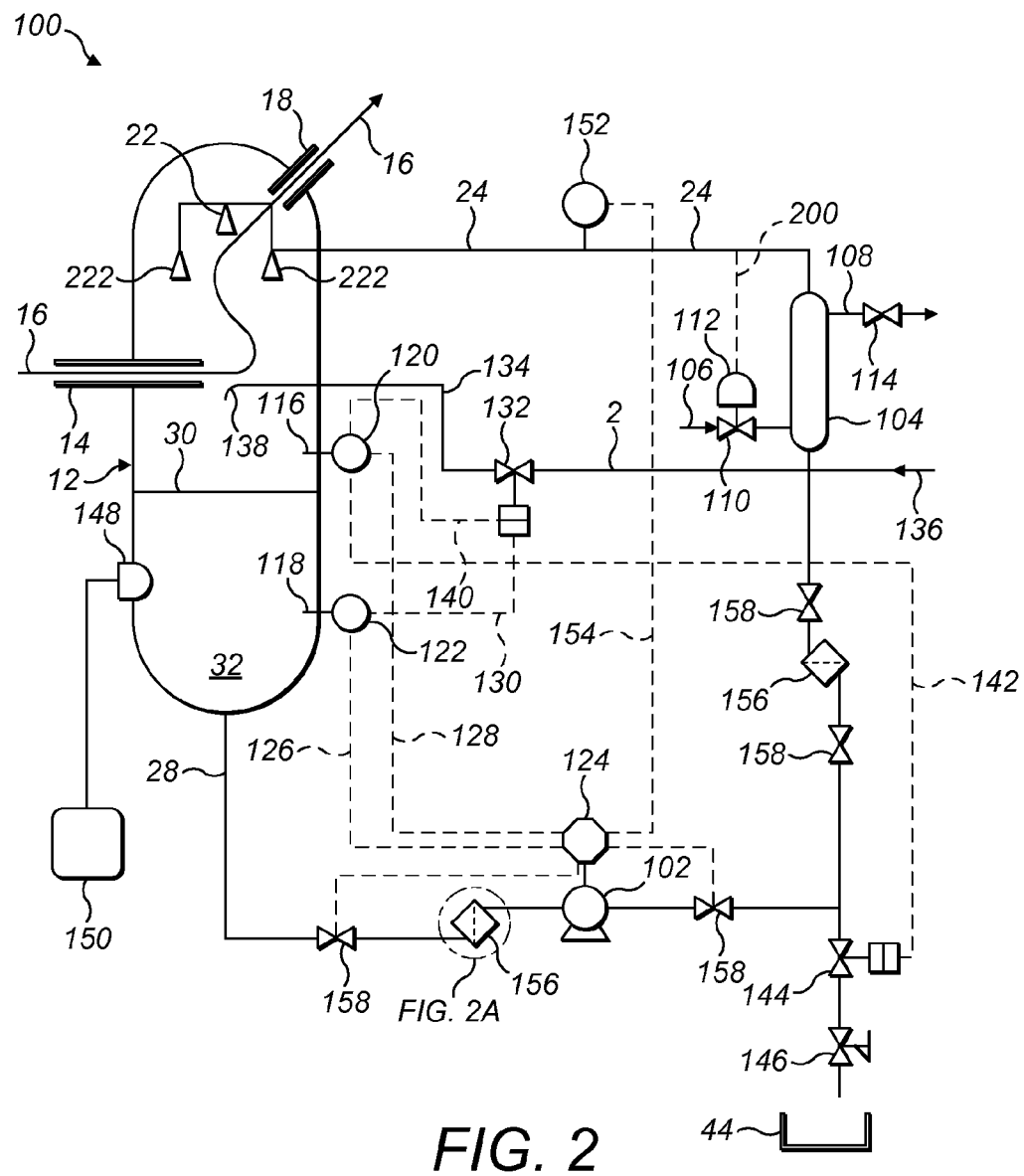
FIG. 2 is a schematic system diagram of a gas scrubber in accordance with the disclosure.

FIG. 2 shows a gas scrubber 100 in accordance with the disclosure, which is similar in number of respects to the known gas scrubber shown in FIG. 1. As such, identical features in FIG. 2 are identified using identical reference signs to corresponding features in FIG. 1 for ease of understanding.

In FIG. 2, a glycol or butanediol (BDO) gas scrubber system 100 is installed upstream of a vacuum pump (not shown) connected to a polymer manufacturing plant, in this case, a PBT process. The scrubber can be used for in other applications, for example in a fatty acid deodorization and its use in a PBT process is only by way of example. The scrubber 100 is designed to remove oligomers, which are present in the process gas 16 being pumped, which are created during PET (Polyethylene terephthalate) or PBT (Polybutylene terephthalate) polymerization processes. The scrubber system 100 is also designed to catch droplets of process chemicals, which assists in protecting the vacuum pumps downstream of the scrubber 100. The scrubber can also act as a spray condenser, which might reduce the capacity of a vacuum pump in certain circumstances.

The scrubber 100 consists of a hollow vessel 12 mounted on a skid (for which see FIG. 3, in particular) alongside its auxiliary equipment and control systems. The scrubber 100 removes oligomers using glycol, butanediol (BDO) or other suitable solvent sprays and is particularly suitable for use as a vacuum gas scrubber for use with a dry vacuum pump system. Suitable solvents generally exhibit a vapor pressure that is lower than the system pressure at that point in the vacuum system (that is, at the pump's inlet).

The scrubber has a primary spray nozzle 22 fitted in the center of the main body of the vessel 12 and has three, additional, secondary spray nozzles 220 fitted at 1200 instances on a pitch circle diameter of 170 mm around the primary nozzle in the same horizontal plane.

The scrubber system 100 consists of a re-circulating pump 102 capable of delivering solvent (glycol or BDO) at required pressure and temperature. The material of construction for impellers is polypropylene with stainless steel material for various parts. A solvent cooler 104 is installed in the re-circulation circuit to remove the heat of condensation and excess heat of the process vapor 16.

In FIG. 2, process gas 16 passes through a cleaning vessel 12 via an inlet port 14 and an outlet port 16 has previously described. The process gas 16 travel upwardly through the interior of the vessel 12 following a serpentine path, contra-flowing against the downwardly directed sprays or mists of solvent released by a number of spray nozzles 22 located towards the top of the vessel 12. Notably, it will be seen that there are a number of spray nozzles 22 located in different radial positions within the vessel, the function of which configurations shall be explained in greater detail below.

The main difference between the gas scrubber 100 of the disclosure and that 10 of the prior art is that the solvent is recirculated and to do this additional controls and circuits are required. Solvent enters the vessel 12 via an inlet line 24 and the nozzles 22 in a manner similar to that described previously. However, rather than simply draining the contaminated solvent 32 to a dump tank, it is recirculated using a centrifugal recirculation pump 102. In other words, solvent enters the vessel 12 via the inlet line 24 and is drained from the vessel 12 via a drain line 28. The pump 102 is interposed between the drain line 28 and the inlet line 24, such that the solvent can be recirculated through the vessel 12.

The process gas 16 contains contaminants, which are removed by the mist solvent by dissolution or condensation processes. The latent heat of condensation of the contaminants (and the hot gas from a booster pump, should the apparatus be located between booster and dry vacuum pumps) causes the solvent 32 to be heated, which heat must be removed if the solvent is to be maintained at a desired operating temperature. In certain circumstances, it may be necessary or desirable to provide additional heaters, for example, trace heating around the pipes and vessel, to heat up the solvent if it becomes too cool, especially if the solvent has a relatively high viscosity at low temperature.

To achieve this, a heat exchanger 104 is provided downstream of the pump 102 and upstream of the inlet line 24. The heat exchanger 104 ensures that the coolant is not contaminated and that the velocity of the fluid through the tubes is high to avoid blockages. The heat exchanger 104 comprises surface heat exchanger of the shell and tube type adapted for glycol or BDO cooling and being capable of removing heat at a rate of ~6 kW using a cooling water flow rate of ~2 m3/h. The heat exchanger has a design pressure of 22 bar and a design temperature of 1200 C. In this example, the cooling water passes on the shell side, whereas the glycol passes through the tubes, the tube material being Cupro-Nickel (90/10 grade).

The heat exchanger 104 is generally of a conventional design and comprises a coolant (for example, cold water, kerosene, ethylene glycol, and the like) inlet 106 and a coolant outlet 108. The coolant is fed from a tank (not shown) using a pump (not shown) into the heat exchanger 104 by the coolant inlet 106. The coolant passes through internal pipes (not shown) within the heat exchanger 104 to cool the solvent. Coolant leaves the heat exchanger 104 via the outlet 108 and fed back into the tank (not shown). Provided the tank (not shown) is sufficiently large, it is not always necessary to provide a chiller to cool the coolant. The coolant inlet 106 is provided with a flow control valve 110, which is connected to a temperature sensing head 112, which monitors the temperature of the solvent in the inlet line 24.

If the temperature of the solvent in the inlet line 24 exceeds a predetermined temperature, the temperature control head 112 opens the inlet valve (not shown) increasing the cooling capacity of the heat exchanger, and vice versa. A further valve 114 is provided on the coolant outlet 108 to limit the flow of coolant through the heat exchanger 104 and to enable the heat exchanger 104 to be isolated, if desired, from the tank (not shown). As such, the temperature of the solvent can be regulated automatically using the heat exchanger 104 and its associated controls 110, 112, 114.

The recirculating pump 102 is capable of delivering up to maximum, and in the exemplary embodiment shown, 22 m3/hr of liquid. The maximum head can be achieved up to 22 m (at reduced flow). The pump 102 is designed to deliver a maximum of about 9.2 m3/hr of glycol at 1.5 barg discharge head.

To achieve this, the recirculating pump 102 must be primed at all times and is provided with a minimum head pressure. This is achieved by locating the recirculating pump 102 below the level of the vessel 12 and by maintaining the level 36 of the solvent 32 within the vessel 12 between an upper level 116 and a lower level 118. To achieve this, the vessel 12 is provided with an upper level sensor 120 in the lower level sensor 122 whose positions within the vessel correspond substantially to the upper 116 and lower 118 levels, respectively.

The recirculating pump 102 is driven by an electric motor 124 whose speed and direction is controlled using an integral motor controller. A lower level sensing control circuit comprises a control line 126 that connects the lower level sensor 122 to the motor controller 124. The lower level sensing control circuit is configured to cause the recirculating pump 102 to slowdown or stop in the event that the level 36 of solvent 32 within the vessel 12 falls below the lower level 118. In addition, the lower level sensing control circuit comprises a valve control line 130 connected to a servo-operated valve 132 of a top up line 134. The top-of-the-line 134 is connected at one end 136 to a supply of fresh solvent (not shown) and at its other end to an outlet 138 located within the vessel 12 above the upper solvent level line 116. Should the level 36 of solvent 32 within the vessel fall below the lower level 118, this will be detected by the lower level sensor 112, which causes the top valve 132 to open thereby enabling level 36 of solvent 32 within the vessel 12 to be topped-up.

Similarly, an upper level sensing circuit comprises a control line 128 connected to the motor controller 124 and the upper level sensor 120 to control the speed of the recirculating pump 102. In this case, if the level 36 of solvent 32 within the vessel 12 exceeds the upper level 116 the control line 128 can signal the motor controller 124 to speed up the pump 12 thereby draining the vessel 12. Alternatively, the pump 102 can be configured not to speed-up but rather to have a regulated flow that is set to minimize nozzle blockage ensure a desired amount of cooling through the heat exchanger. In addition, should the level 36 of solvent 32 within the vessel 12 remain above the upper limit of 116, the upper level sensor 120 is also connected via a further control line 142 the valve 132 of the top-up line 34 to reduce or shut-off the flow of fresh solvent into the vessel 12. In addition, the upper level sensor 120 is connected via a third control line 142 to a servo-actuated valve 144 of the drain line 28. Located downstream of the servo-actuated valve 144 is adjustable flow control valve 146, which limits the rate of flow of contaminated solvent into the dump tank 44. The purpose of the adjustable flow control valve 146 is to limit or prevent the vessel 12 from emptying too quickly and setting is likely to be pre-set during commissioning.

Using such a system, the solvent can be recirculated rather than simply used once and discarded and the level 36 of solvent 32 within the vessel can be maintained at a level that ensures that the recirculating pump 12 is continuously and correctly primed.

It will be appreciated that as contaminants are removed from the process gas 16, the solvent 32 will become increasingly contaminated over time. The viscosity of a contaminated solvent 32 is generally higher than that of a fresh solvent and so it will be necessary, from time to time, to purge the system. In this regard, a solvent quality sensor 148 is provided with a lower portion of the vessel 12 and is connected to a computer 150 that analyses the condition of the solvent in real-time. The solvent quality sensor can be any sensor that senses any property of solvent that varies with quality, for example a specific gravity sensor, resistivity sensor, a capacity sensor, viscosity sensor, pump power or current sensor, or the like. In the illustrated example, an in-line flow sensor 152 is provided that monitors the flow rate of solvent within the feed line 24. In the event that the viscosity of the solvent increases, the flow rate of the solvent would be expected to produce correspondingly, and a control line 154 is provided in such a situation to cause the motor 124 of the recirculating pump 102 to work harder. The control line 154 can be connected to the computer 150 to provide a real-time indication of the viscosity of the solvent within the system.

In the event that the computer 150 detects that the quality of the solvent within the system has fallen below a predetermined threshold value, it may signal a full or partial purge of the solvent 32.

Purging is achieved by opening the server-actuated valve 144 on the drain line 28 two partially empty the vessel 12. As the solvent 32 within the vessel 12 drains off, its level will eventually fall below the lower level line 118, which will automatically trigger the top-up valve 132 to open thereby replenishing the solvent 32 with fresh solvent from the fresh solvent supply 136. It will be appreciated that because the solvent 32 is only trained when large amounts of contaminants are being extracted from the process gas or during a purge, the volume of solvent required to operate is considerably lower than a continuously-fed system. One of the main advantages of this are reduced use of solvents and a reduced output of waste solvent. Moreover, because waste solvent is outputted batch-wise, management of the waste solvent is better facilitated.

The frequency of purging can be reduced by providing one or more in-line filters in the recirculating solvent circuit. In the illustrated example, in-line filters 156 are provided upstream of the recirculating pump 12 and upstream of the heat exchanger 104. Isolating valves 158 are provided either side of the filters 156 to enable them to be changed or cleaned should they become clogged. Bypass lines (not shown) may optionally be provided to enable the scrubber 100 to continue to operate without filters 156 present, although it will be appreciated that in some circumstances, no significant harm will be done in the short time the scrubber is not operating.

Figure 2A:
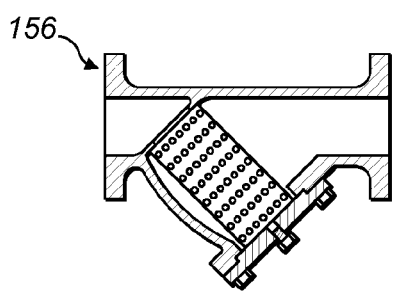
FIG. 2A is a cross-sectional diagram of a filter.

The filter or filters 156 (as shown in greater detail in cross-section in FIG. 2A) have a filter inlet size of preferably but not exclusively 40 mm and are manufactures of 315 grade stainless steel. The perforated screen size is of the filter is preferably 400 microns giving a rated pressure drop of between 0.05 and 0.2 bar. The filters 156 are in-line type filters whereby solvent enters through the end of a removably retained basket-type filter scrim, and exits through the sidewalls thereof to the outlet.

Figure 3:
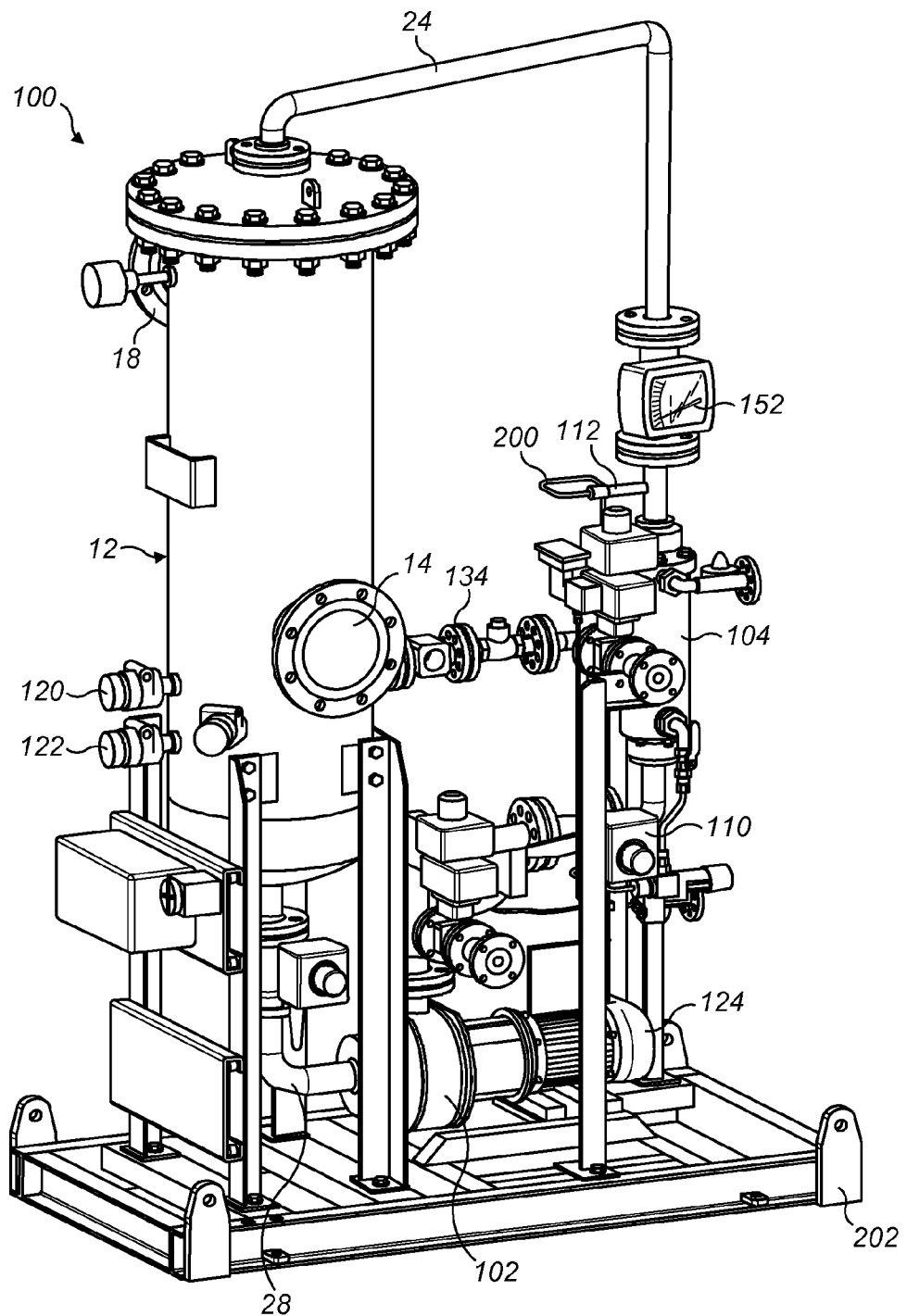
FIG. 3 is a perspective view of a first embodiment of a gas scrubber skid in accordance with the disclosure.

In FIG. 3, an embodiment of a gas scrubber 100 according to disclosure is shown and comprises a vessel 12 having the inlet port 14 and outlet port 18 previously described through which process gas 16 enters and leaves the vessel 12, respectively. In the illustrated embodiment, the cleaning solvent is a mixture of glycol and butanediol (BDO) and enters the vessel 12 by inlet pipe 24. The temperature of the glycol in the inlet pipe 24 is monitored using a temperature gauge 112 and the flow rate of the solvent is monitored using a flow gauge 152. Temperature gauge 112 is connected to a servo-actuated control valve 110 via a pilot line 200, the servo-actuated control valve 110 be used to control the flow of cooling water into a heat exchanger 104. The temperature of the solvent within the pipe 24 can therefore be regulated automatically by adjusting the supply of cooling water into the heat exchanger 104 in response to sensed changes in solvent temperature.

As previously mentioned, the solvent enters the chamber 12 by inlet pipe 24 and drains therefrom fire drain pipe 28. Solvent is recirculated through the system by a recirculating pump 102 driven by an electric motor 124. The level of solvent within the vessel 12 is monitored using the low level sensor 122 and the upper level sensor 120 in the manner previously described. Furthermore, the level of solvent within the vessel 12 can be top-up using top-of-the-line 134.

It will be noted that the gas scrubber of the illustrated embodiment is mounted on a skid 202 for ease of transportation and mounting. It will also be noted that the overall size of the gas scrubber 100 is compact owing to the lack of a barometric leg that would otherwise need to be present in the scrubber 100 did not recirculated the cleaning solvent.

Figure 4:
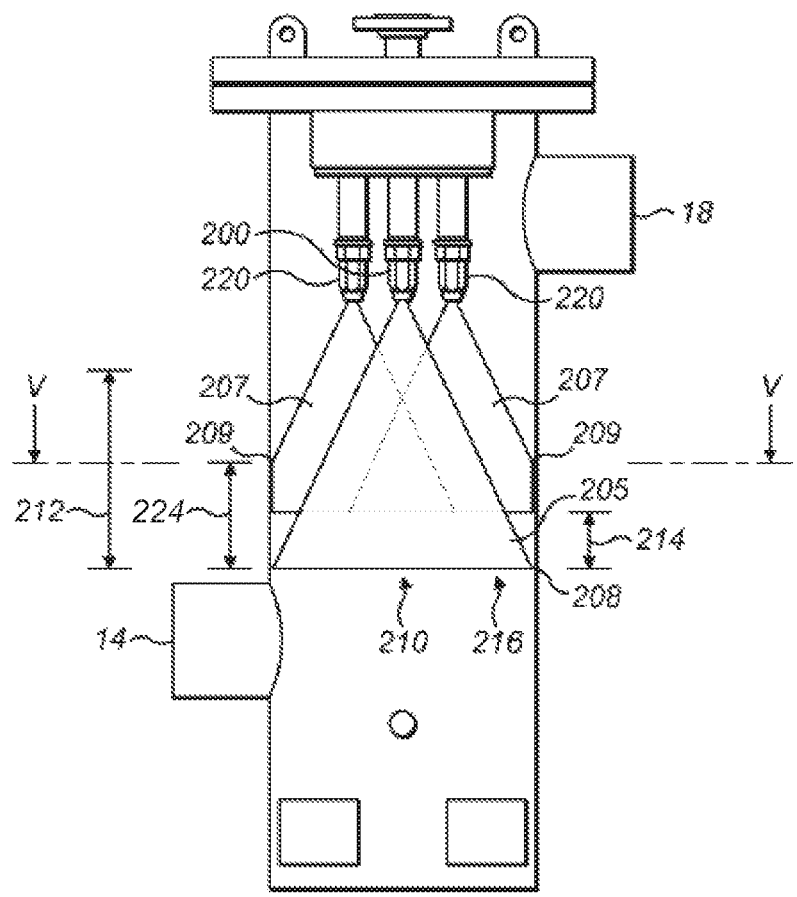
FIG. 4 is a schematic lateral cross section through a second embodiment of a vessel for a gas scrubber in accordance with the disclosure.

FIG. 4 shows an arrangement of nozzles 22 within the vessel 12 in greater detail. Identical features in FIG. 4 are designated by identical reference signs to identical features described previously, for ease of understanding. In FIG. 4, there are four spray nozzles located within an upper portion of the chamber 12 below the level of the outlet port 18. In particular, there is a central nozzle 206 that is located substantially on the centerline of the vessel 12 and which provides a substantially solid conical, downwardly directed spray 205 of cleaning solvent. The "cone" of spray emanates from the nozzle 206 and travels axially and a radially to impinge upon the inner sidewalls of the vessel 12 at a point 208 below the level of the nozzle 206, but above the level of the inlet port 14. As such, process gas 16 entering the vessel 12 via the inlet port 14 must pass through the cone 205 spray created by the central nozzle 206.

It will be noted that process gas 210 travelling up through the vessel 12 at or near to the centerline of the vessel 12 will travel through the cone 205 over a much greater distance 212 than the distance 214 traveled by process gas 216 moving upwardly through the vessel 12 nearer to its sidewalls.

In order to efficiently remove contaminants from the process gas 16, the process gas 16 must travel a certain minimum distance through the spray of cleaning solvent. In order to ensure that this happens, one can simply elongate the vessel 12 to increase the distance that the process gas 16 must travel through the spray before it exits through the outlet port 18. However, in a skid-based embodiment of the disclosure, such as that shown in FIG. 3, it is desirable to make the vessel 12 as compact as possible. Therefore, to ensure that the process gas 16 always travels through the cleaning solvent spray for more than a desired minimum distance, supplementary nozzles 220 are provided. It will be noted that the supplementary nozzles 220, 222 are located radially outwardly of the main nozzle 206 and are arranged to provide substantially conical sprays 207 of cleaning solvent that impinge upon the inner sidewalls of the vessel 12 at a point 209 slightly higher up the vessel 12 than the cone 205 of the central nozzle 206. By providing a plurality of axially spaced and overlapping cones 205, 209 of solvent spray, even process gas to 16 moving upwardly through the vessel 12 adjacent the inner sidewalls thereof must pass through a minimum distance of spray to 224, as defined by the difference in height of the intersection points 208, 209 of the central 205 and the outer cones 209 on the inner sidewall of the vessel 12.

Figure 5:
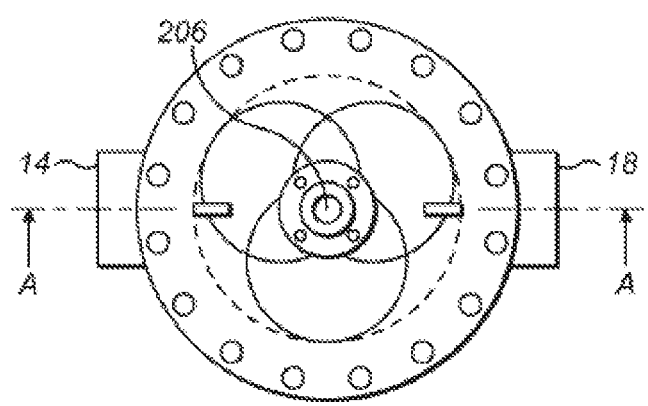
FIG. 5 is a schematic transverse cross section through the vessel of FIG. 4 on V-V.

It will be seen from FIG. 5, that there are four nozzles including a central nozzle 206 and three radially outwardly spaced nozzles 220 at 120° instances.

It is also important that the nozzles do not become blocked during operation and for that the free passage of the nozzle is sufficiently large (~6.4 mm) to maintain a free flow of solvent. The nozzles are also designed to be self-cleaning, although they can also be manually cleaned or serviced by removing the upper portion of the vessel 12.

In the present example, the nozzles are of the type supplied by Spraying Systems Co., model: 1¼ H-SS6 FullJet Nozzles having female NPT connections. The nozzles are manufactured of stainless steel and have removable polypropylene vanes and a maximum temperature rating of 600 C. The nozzles can each deliver 38 liters/minute at 1.5 bar operating pressure, the optimum pressure being between 0.5 bar and 1.5 bar.

Figure 6:
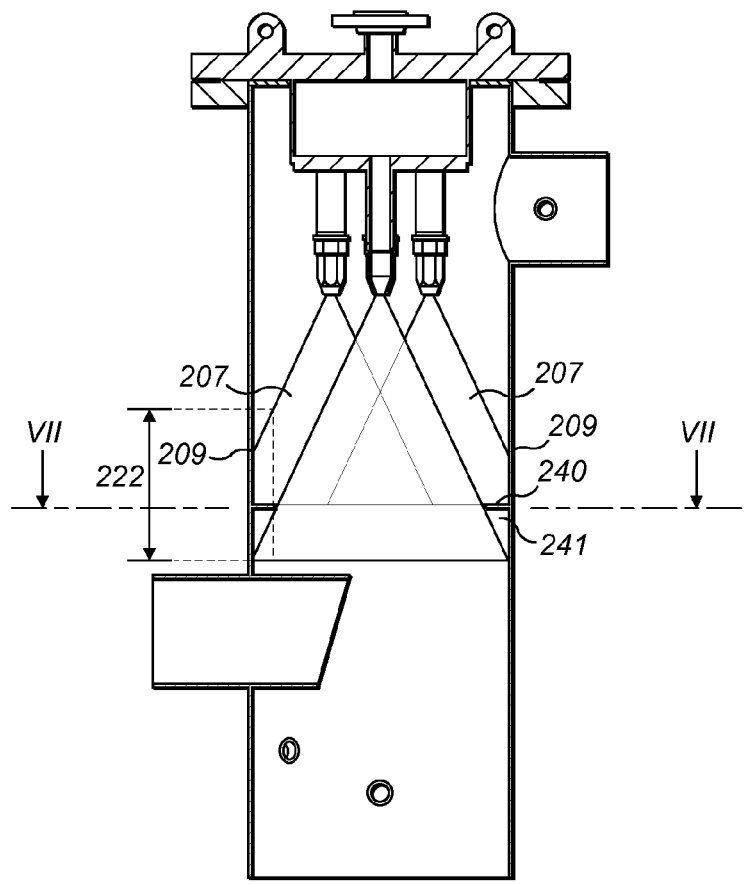
FIG. 6 is a schematic lateral cross section through a third embodiment of a vessel for a gas scrubber in accordance with the disclosure.
Figure 7:
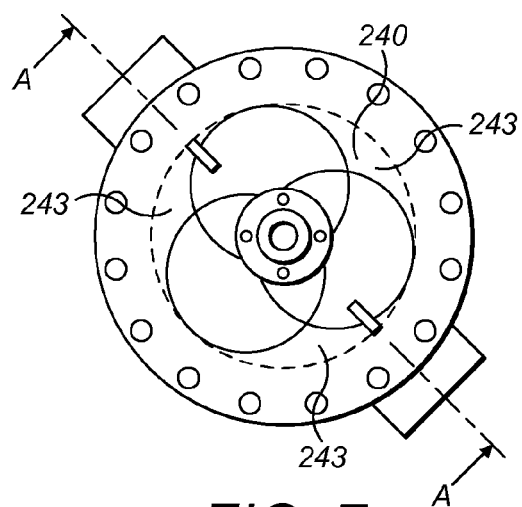
FIG. 7 is a schematic transverse cross section through the vessel of FIG. 6 on VII-VII.

Turning now to FIGS. 6 & 7, which shows a variation on the arrangement shown in FIG. 4, it will be noted that the minimum distance 224 can be increased by providing an inwardly-projecting annular flange 240 on the inner sidewall of the vessel 12. The purpose of the annular flange 240 is to provide an aperture located inwardly from the sidewalls of the vessel 12 through which the process gas 16 must flow thereby increasing the distance in which the process gas travels through the solvent mist or spray as it moves upwardly through the vessel. A further effect of the annular flange 240 is to disturb the downward flow of the solvent spray creating eddy currents 241 downstream of the flange 240 thereby creating a secondary spray nozzle beneath the flange 240 using solvent that runs down this inner sidewalls of the vessel 12.

The annular flange 240 stops liquid from draining straight to the bottom of the vessel 12 and helps create an annular zone around the primary nozzle spray blocking any gas 16 escaping without being entrained by the primary spray nozzle. The location of the flange 240 is optimized with reference to the primary nozzle spray characteristics. The secondary function of the drip ring is to create another spray by gravitational drop of collected liquid from the wall thus enhancing the entrainment of the liquid particle from the process.

In FIGS. 6 & 7, it will be noted that all of the secondary jets 207 have impinged on the wall of the vessel at a level 209 higher than that of the annular flange 240. As such, the small gap 243 shown in FIG. 7 between the secondary jets is irrelevant because by the time any gas reaches this point, the gas has already been entrained by the full circular spray covering the whole inside diameter of the vessel and also because the effective inside diameter for the secondary spray needed is the inside diameter of the annular flange 240, which is smaller than the inner diameter of the vessel 12.

The nozzles 206, 222 designs have an aperture therein that is large enough to not be clogged by particulate contaminants that may become entrained in the cleaning solvent and are adjustable during commissioning of the scrubber 100 to enable the shape, that is the spread and length of the components of spray, to be adjusted to suit particular applications. Furthermore, the annular flange 240 is removable or replaceable during commissioning so that the scrubber 100 can be set up to operate using a range of solvent having different viscosities or flow properties.

Figure 8:
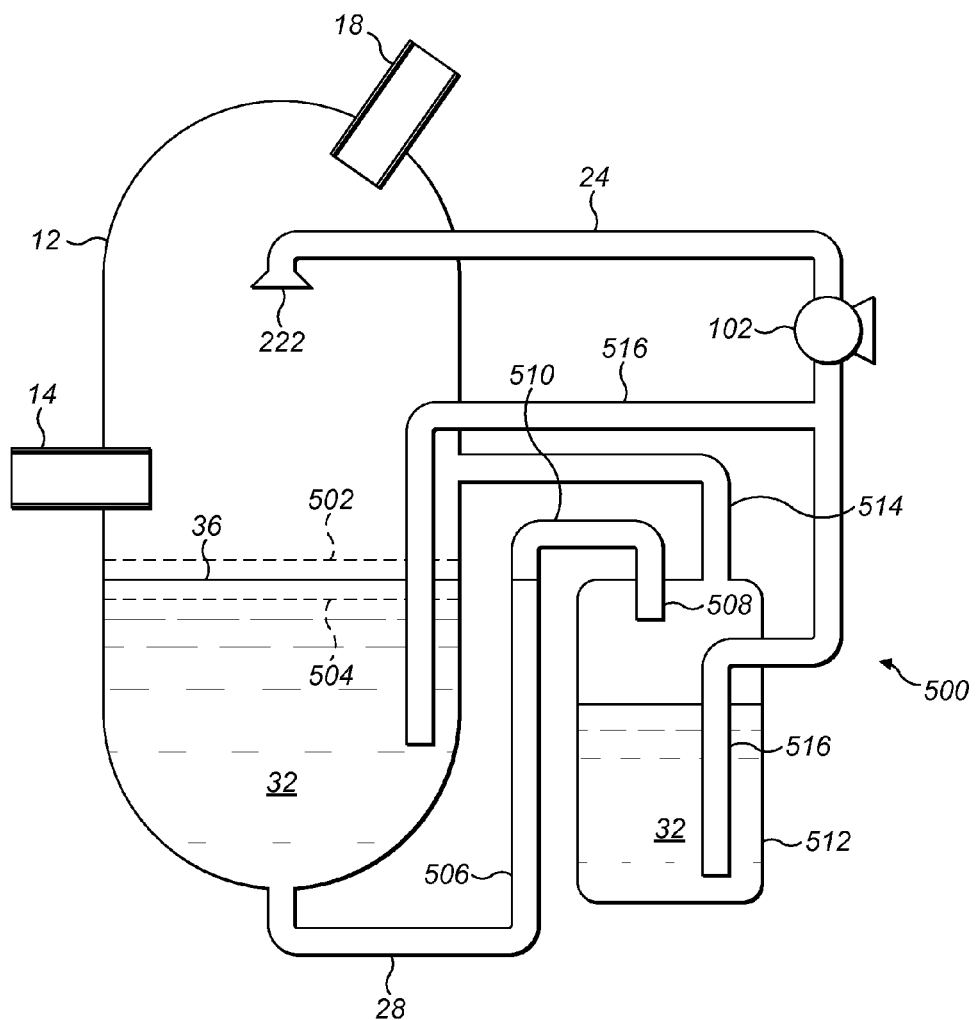
FIG. 8 is a schematic system diagram showing a first alternative embodiment of the recirculation system shown in FIG. 2.
Figure 9:
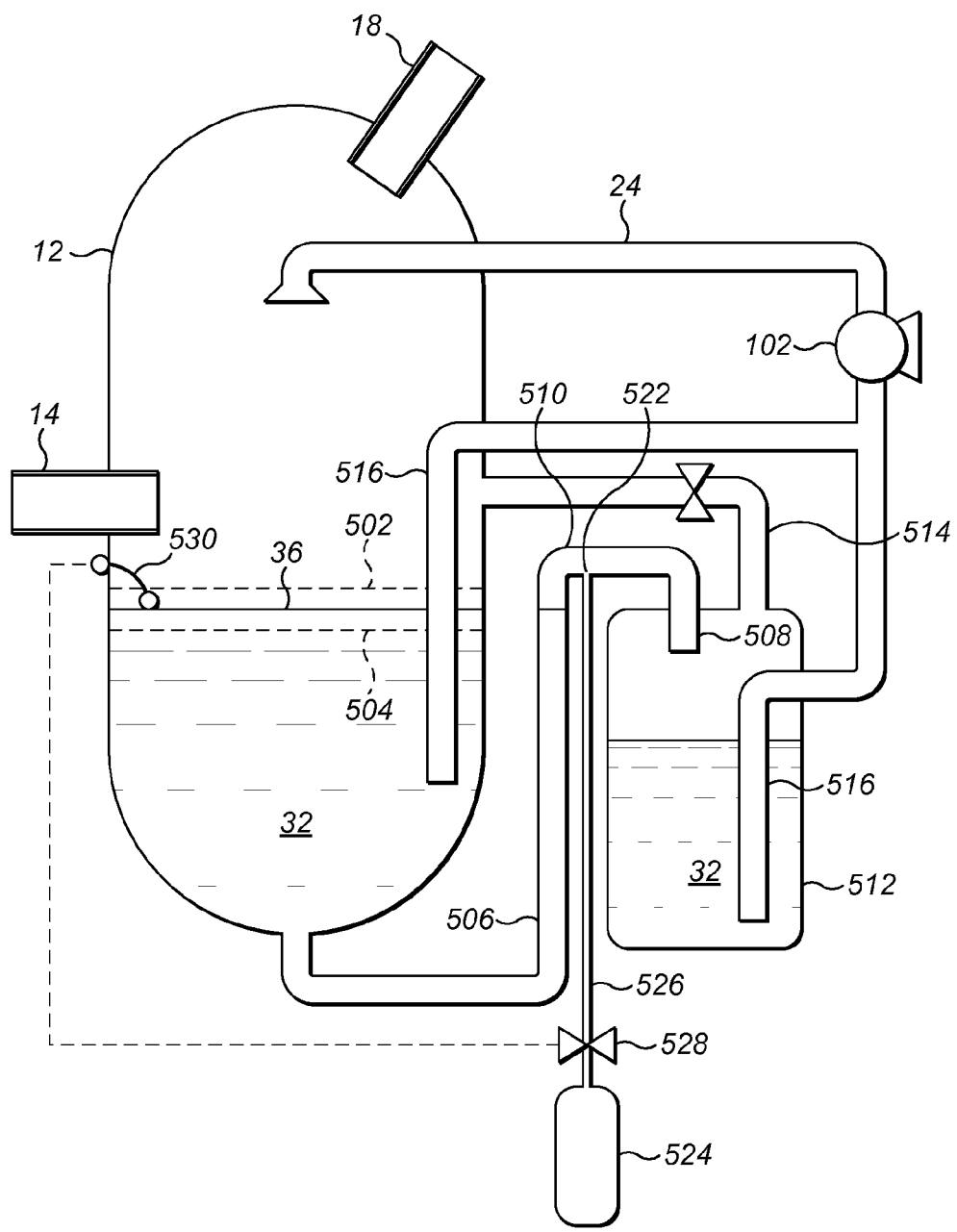
FIG. 9 is a schematic diagram showing a second alternative embodiment of the recirculation system shown in FIG. 2.

FIGS. 8 and 9 show alternative embodiments of the invention as shown in FIG. 2 in which the recirculation leg comprises an automatic siphon drainage system. In FIG. 8, the vessel 12 is part-filled with a solvent 32 up to a desired fill level 36 and comprises an outlet pipe 28 through which excess solvent 32 can drain. The outlet pipe 28 comprises a siphon arrangement 500, which serves to maintain the solvent fill level 36 between upper 502 and lower 504 levels. The outlet pipe 28 comprises a gooseneck having a first tube portion 506 up to the desired upper fill level 502 and a second tube portion 508 connected to the first tube portion 506 by a U-bend portion 510. The second tube portion terminates at a level corresponding to the lower fill level 504 and is arranged to discharge solvent 32 into a second vessel 512. A pilot line 514 interconnects the evacuated spaces within the first 12 and second vessels 512 such that the vacuum pressure above the solvent 30 in?? (32 in) both vessels is equalised, which arrangement enables the siphon arrangement to function correctly.

As the first vessel 12 is filled with solvent 32, the level 36 will increase until it reaches the upper fill level 502, whereupon excess solvent will begin to flow over the U-bend portion 510 and siphon off into the second vessel 512. When the fill level 36 reaches the lower fill level 504, there is no head of solvent above the termination level of the second tube portion 508, which breaks the siphon and prevents further emptying of solvent 32 from the first vessel 12. Excess solvent is thus collected and stored in the second vessel, from where it can be drawn back to the solvent inlet via a feed pipe 516 which extends below the fill level of solvent 32 in the second vessel 512, using a pump 102 as previously described. It will be noted that the pump 1 02 is connected to both the solvent 32 in the main vessel 12 and the second vessel 512 via pipes ensuring that it remains primed and able to recirculate solvent back to the solvent inlet 24 and nozzle(s) 222.

Fresh solvent can be introduced into the first vessel 12 using a system described previously (not shown) and contaminated solvent can be taken off from either vessel 12, 512, also in a manner previously described.

FIG. 9 shows a variation of the arrangement shown in FIG. 8 in as much as the pilot line 514 is provided with a valve 520 (FIG. 9 missing the valve designation) that enables a pressure differential between the vacuum pressures within the empty spaces of the first 12 and second vessels 512 to be maintained. In addition, the siphon arrangement of FIG. 9 additionally comprises a purge gas injection port 522 in the U-bend portion 510 of the outlet pipe 28 to enable the siphon effect to be artificially broken by the introduction of a purge gas into the siphon 500. The purge gas 524 is introduced via a purge gas pipe 526, and is controlled using a flow control valve 528 that is actuated by a level sensor 530 mounted inside the main vessel 12. As the fill level 36 within the main vessel 12 exceeds the upper fill level 502, the level sensor 530 triggers the purge gas control valve 528 to open allowing purge gas to enter the U-bend portion 510 thereby breaking the siphon and preventing further drainage of solvent 32 from the main vessel.

The embodiments shown in FIGS. 8 and 9 are functionally similar to the arrangement shown in FIG. 1 except that the barometric leg, which can cause installation problems in restricted spaces, has been removed. In addition, the embodiments of FIGS. 8 and 9 benefit from the advantages of the embodiment of FIG. 2, with the added benefit of a mechanical/physical fill level regulation, which reduces the number of sensors and control valves need for the device to operate effectively. Nevertheless, in all cases, the fill level 36 of solvent 32 within the main vessel 12 is maintained within pre-set upper and lower limits, whilst maintaining the vacuum above the solvent 32 in the main vessel 12.

The invention claimed is:

1. A sub atmospheric pressure gas scrubber suitable for use upstream of a vacuum pump, the gas scrubber comprising:
    a vessel; and
    means for forming a spray of cleaning solvent within the vessel,
    wherein the vessel comprises an inlet and an outlet for the gas to be cleaned at sub atmospheric pressures, the inlet and outlet being arranged to cause the gas to be cleaned to pass through the spray of cleaning solvent,
    wherein the means for forming the spray of cleaning solvent comprises a plurality of spray nozzles,
    wherein the plurality of spray nozzles comprises a main spray nozzle and additional spray nozzles that are offset radially or radially and axially with respect to the main spray nozzle,
    wherein the main spray nozzle and the additional spray nozzles are oriented in substantially the same direction,
    wherein the main spray nozzle is mounted substantially coaxially with the vessel and adapted to form a full circular spray pattern that covers the whole inside diameter of the vessel, and
    wherein each spray nozzle of the plurality of spray nozzles are arranged to form a spray pattern of cleaning solvent within the vessel, wherein the spray patterns are arranged to overlap radially or radially and axially.

2. The gas scrubber of claim 1, wherein the spray nozzles are located within the vessel at a level below that of the outlet.

3. The gas scrubber of claim 1, wherein the spray nozzles are adapted to produce a substantially solid conical, downwardly directed spray of cleaning solvent.

4. The gas scrubber of claim 1, wherein a cone of spray from each spray nozzle of the plurality of spray nozzles travels axially and radially to impinge upon inner sidewalls of the vessel at a point below a level of the spray nozzle and above a level of the inlet.

5. The gas scrubber of claim 1, wherein the spray nozzles of the plurality of spray nozzles are co-planar.

6. The gas scrubber of claim 5, wherein the spray nozzles produce different spray patterns to produce overlapping sprays of cleaning solvent.

7. The gas scrubber of claim 1, wherein the additional nozzles are adapted to provide substantially conical sprays of cleaning solvent that impinge upon inner sidewalls of the vessel at a point higher up the vessel than a spray cone produced by the main spray nozzle.

8. The gas scrubber of claim 1, wherein the spray nozzles of the plurality of spray nozzles are inclined with respect to a lateral plane of the vessel.

9. The gas scrubber claim 1, wherein the spray nozzles have an opening of about 6.4 mm.

10. The gas scrubber of claim 1, wherein the spray nozzles are self-cleaning.

11. The gas scrubber of claim 1, wherein the spray nozzles comprise removable or adjustable vanes.

12. The gas scrubber of claim 1, wherein the vessel further comprises an inwardly-projecting annular flange on an inner sidewall of the vessel.

13. The gas scrubber of claim 12, wherein the location and dimensions of the annular flange are adjustable.

14. The gas scrubber of claim 1, wherein the spray nozzles are located within the vessel at a level below that of the outlet and above that of the inlet, wherein the nozzles are adapted to produce a substantially solid conical, downwardly directed spray of cleaning solvent such that the gas to be cleaned contraflows through the spray of cleaning solvent.

15. The gas scrubber of claim 1, wherein the inlet, the outlet, and the means for forming the spray of cleaning solvent are arranged such that the gas to be cleaned contraflows through the spray of cleaning solvent.

* * * * *